(12) United States Patent
Peters, Jr. et al.

(10) Patent No.: US 7,160,444 B2
(45) Date of Patent: Jan. 9, 2007

(54) SYSTEM FOR REMOVING CONTAMINANTS FROM STORM WATER

(76) Inventors: John Peters, Jr., 37 Florence Dr., Manorville, NJ (US) 11949; John Markee, 18 Wyeth St., Selden, NY (US) 11784

(*) Notice: Subject to any disclaimer, the term of this patent is extended or adjusted under 35 U.S.C. 154(b) by 0 days.

(21) Appl. No.: 11/242,534

(22) Filed: Oct. 3, 2005

(65) Prior Publication Data
US 2006/0054562 A1    Mar. 16, 2006

Related U.S. Application Data

(63) Continuation of application No. 10/430,170, filed on May 5, 2003, now abandoned.

(51) Int. Cl.
*C02F 3/00* (2006.01)
(52) U.S. Cl. .............. 210/163; 210/164; 210/263; 210/264; 210/266; 210/282; 210/291
(58) Field of Classification Search ........ 210/163–164, 210/263, 264, 266, 282, 291
See application file for complete search history.

(56) References Cited

U.S. PATENT DOCUMENTS

| | | | |
|---|---|---|---|
| 4,923,330 A | 5/1990 | DeTommaso | |
| 5,622,630 A | 4/1997 | Romano | |
| 5,707,527 A * | 1/1998 | Knutson et al. | 210/660 |
| 5,744,048 A | 4/1998 | Stetler | |
| 5,954,952 A | 9/1999 | Strawser, Sr. | |
| 6,027,639 A | 2/2000 | Lenhart, Jr. et al. | |
| 6,059,964 A | 5/2000 | Strawser, Sr. | |
| 6,080,307 A | 6/2000 | Morris et al. | |
| 6,099,723 A | 8/2000 | Morris et al. | |
| 6,106,707 A | 8/2000 | Morris et al. | |
| 6,231,758 B1 | 5/2001 | Morris et al. | |
| 6,241,889 B1 | 6/2001 | Haley, III | |
| 6,277,274 B1 | 8/2001 | Coffman | |
| 6,350,374 B1 | 2/2002 | Stever et al. | |
| 6,368,499 B1 | 4/2002 | Sharpless | |
| 6,447,686 B1 | 9/2002 | Choi et al. | |
| 6,789,396 B1 | 9/2004 | Olin-Nunez et al. | |
| 2003/0034286 A1 | 2/2003 | Butler | |

* cited by examiner

*Primary Examiner*—Chester T Barry
(74) *Attorney, Agent, or Firm*—Knoble Yoshida & Dunleavy,LLC

(57) ABSTRACT

A system for treating storm water in situ within a storm water drainage system includes a process chamber and treatment material that is contained within the process chamber. Preferably, the treatment material is a material that is effective in removing heavy metals from storm water, such as zeolite. A first passageway is provided for admitting storm water from the storm water drainage system into the process chamber. A second passageway is provided for returning storm water from the process chamber back to the storm water drainage system. Also disclosed is a method of retrofitting conventional storm water drainage systems so as to render them capable of effectively removing heavy metals from storm water passing therethrough.

12 Claims, 8 Drawing Sheets

SYSTEM FOR REMOVING CONTAMINANTS FROM STORM WATER

This is a continuation of application Ser. No. 10/430,170, filed May 5, 2003 now abandoned, the disclosure of which is hereby incorporated by reference as if set forth fully herein.

BACKGROUND OF THE INVENTION

1. Field of the Invention

This invention relates to systems and processes for cleansing storm water, such as that which is created by storm runoff from streets, highways, parking lots and other paved surfaces into drainage systems in major urban areas.

2. Description of the Related Technology

Storm water that is created by storm runoff in heavily developed areas is typically channeled into storm drainage systems that eventually drain into nearby streams, creeks, rivers or other bodies of water. Unfortunately, paved surfaces that bear automobile traffic typically become coated with significant pollutants such as heavy metals and volatile organic compounds, both under normal traffic conditions and in particular when motor vehicle accidents occur. When normal rain or snowfall occurs, these pollutants tend to be swept away with the runoff storm water and eventually lead to contamination of the bodies of water that eventually receive them. Such contamination has become a significant environmental issue in many areas. In addition, a significant amount of debris such as bottles and cans tends to be swept away by storm water runoff.

Systems exist for filtering storm water runoff that are effective in removing debris from storm water and in removing certain other pollutants, such as hydrocarbons. For example, U.S. Pat. No. 6,080,307 discloses a storm drain insert that contains one basket for the collection of debris as well as a canister that contains a hydrophobic, compliant, oil-absorbent copolymer material that is said to be effective in removing oil from the storm water.

Unfortunately, prior to this invention no system or process has been developed that is capable of removing heavy metals from storm water in situ within a storm water drainage system. Technology exists for removing heavy metals from storm water within complex storm water treatment facilities, but not locally within storm water drainage systems where such treatment facilities are not present.

A need exists for an improved system and process for processing storm water that is effective in removing heavy metals, as well as hydrocarbons and other volatile organic compounds, from the storm water in situ within a storm water drainage system.

SUMMARY OF THE INVENTION

Accordingly, it is an object of the invention to provide an improved system and process for processing storm water that is effective in removing heavy metals, as well as hydrocarbons and other volatile organic compounds, from the storm water in situ within a storm water drainage system.

In order to achieve the above and other objects of the invention, a method of removing heavy metals from storm water according to a first aspect of the invention comprises steps of positioning a treatment system within a drainage space through which storm water is designed to flow, the treatment system comprising a process chamber in which a treatment material that is capable of absorbing heavy metals from storm water is disposed, the treatment system further comprising a first passageway for admitting storm water from the drainage space into the process chamber and a second passageway for permitting treated storm water to return from the process chamber to the drainage space; and permitting storm water to flow through the drainage space, whereby it is at least partially treated by the treatment system.

According to a second aspect of the invention, a method of retrofitting a storm water drainage system for the purpose of reducing heavy metal contamination of storm water that may flow therethrough, includes steps of reconfiguring a storm water drainage system that has a drainage space through which storm water is designed to flow by installing a treatment system, the treatment system comprising a process chamber in which a treatment material that is capable of absorbing heavy metals from storm water is disposed, the treatment system further comprising a first passageway for admitting storm water from the drainage space into the process chamber and a second passageway for permitting treated storm water to return from the process chamber to the drainage space; and permitting storm water to flow through the retrofitted storm water drainage system.

According to a third aspect of the invention, a system for treating storm water in situ within a storm water drainage system includes a process chamber; treatment material contained within the process chamber, the treatment material being capable of absorbing heavy metals from storm water; a first passageway for admitting storm water from the storm water drainage system into the process chamber; and a second passageway for permitting treated storm water to return from the process chamber to the storm water drainage system.

A method of removing heavy metals from storm water according to a fourth aspect of the invention includes a step of introducing into a storm water drainage system a treatment material that is capable of absorbing heavy metals from storm water.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
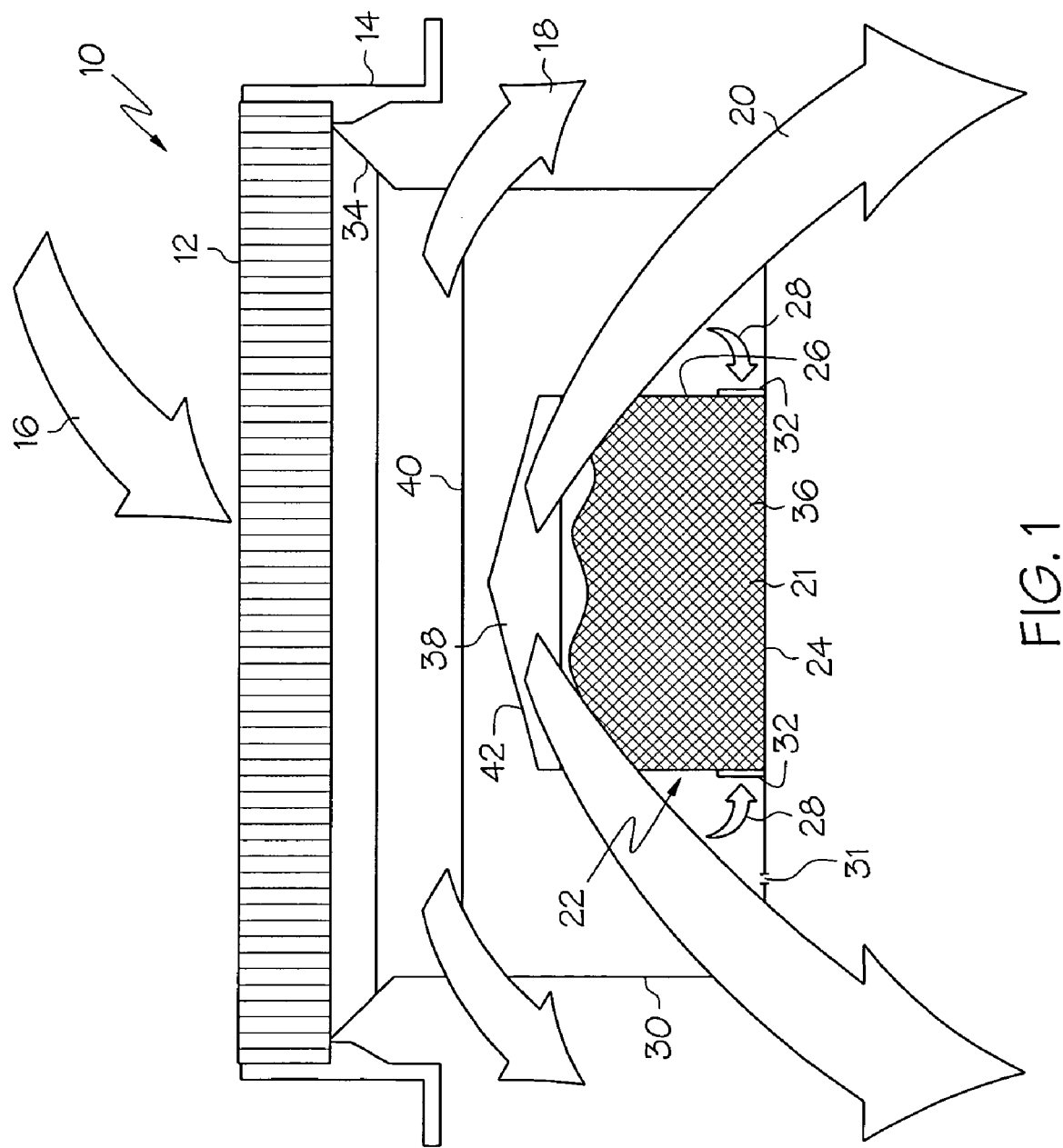
FIG. 1 is a diagrammatic view depicting a system according to a first embodiment of the invention.
Figure 2:
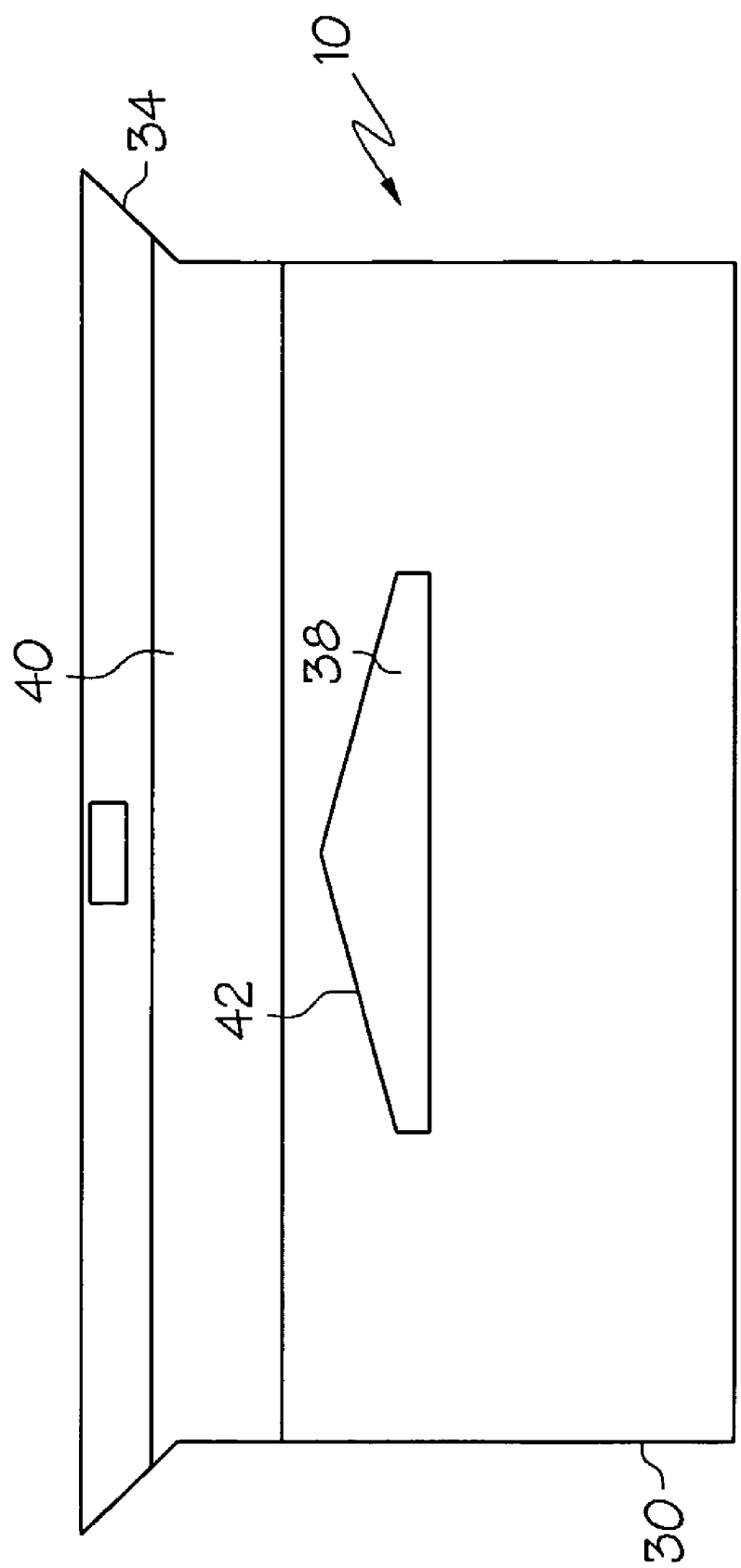
FIG. 2 is a front elevational view of on in said sidewall.e portion of the system that is depicted in FIG. 1.

Referring now to the drawings, wherein like reference numerals designate corresponding structure throughout the views, and referring in particular to FIG. 1, a system 10 according to a first embodiment of the invention for treating storm water in situ within a storm water drainage system that includes a storm grate 12 set within a frame rim 14 is constructed and arranged to process inflowing storm water 16, as is shown diagrammatically in FIG. 1. System 10 is further constructed so that during heavy storm water flow conditions any excess flow 18 of storm water that is incapable of being processed by the system 10 will be permitted to flow through an overflow or bypass opening 40 into the storm water drainage system, as will be described in greater detail below. Bypass opening 40 is capable of handling a flow of at least 5000 gallons per minute. Storm water 20 that is processed by the system 10 will also flow into the storm water drainage system through a pair of exit openings 38, as will also be described in greater detail below.

As is further shown in FIG. 1, a process chamber 21 is defined within a receptacle 22 that has a bottom surface 24 and a plurality of side surfaces 26. Receptacle 22 is integral with a metallic tray 30 that is mounted so as to depend downwardly from the storm grate 12 and the connected frame rim 14. An upper portion of tray 30 is shaped as a funnel 34 so as to ensure that storm water passing through the storm grate 12 will be directed into the tray 30. In order to avoid having standing water within the tray 30 for extended periods of time, a number of drain openings 31 may be provided in a lower surface of the tray 30 to provide slow drainage. The drain openings 31 may be covered by a spongelike material to ensure that only a very slow flow of liquid is permitted to pass therethrough.

Figure 4:
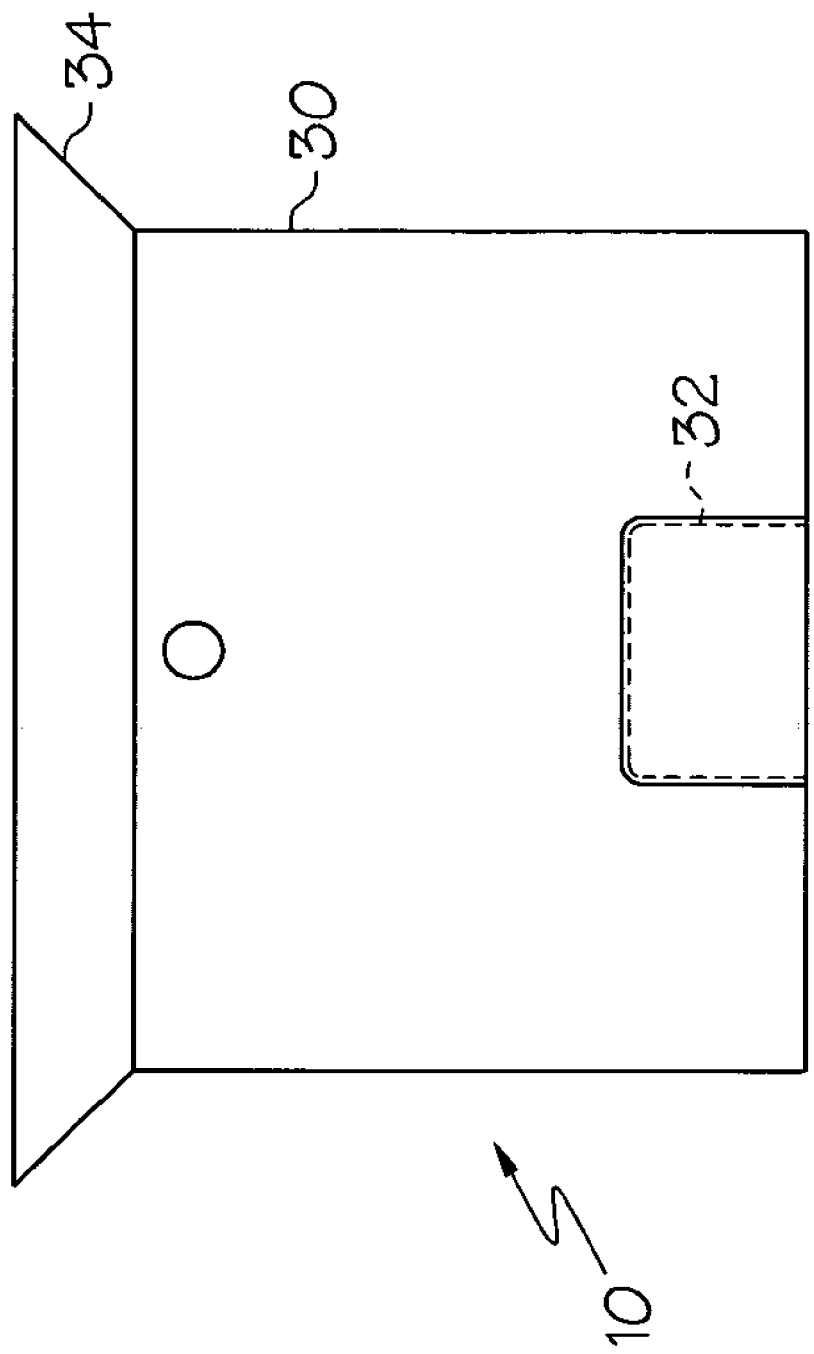
FIG. 4 is a side elevational view of the portion of the system that is shown in FIGS. 2 and 3.

As may be seen in FIGS. 1 and 4, a pair of openings 32 are defined in oppositely facing side surfaces 26 of the receptacle 22 for permitting storm water 28 that is collected in a lower portion of the tray 30 to enter into the process chamber 21, where it will interact with treatment material 36 that is contained within the process chamber 21. Treatment material 36 is preferably material that is capable of absorbing heavy metals from storm water.

With respect to all of the embodiments of the invention that will be described herein, the preferred active ingredient within treatment material 36 is a zeolite that has an ion exchange capacity. Zeolite is a porous crystal material composed mainly an aluminum and silicon with other minerals such as potassium, calcium and sodium, which are used as exchangeable cations. The individual crystals bond together in long chains creating a lattice type network of interconnected cavities, pores and open spaces which provide sites for cation exchange and adsorption. As a filtering media, zeolite will draw liquid runoff into its crystal structure where it is adsorbed onto the large surface areas. Suspended solids are effectively removed, and become physically entrapped or encapsulated within these cavities and pores. The zeolite effectively may function as a filter bed as well as a process material for cation exchange and adsorption. Toxic metal ions in the liquid displace the calcium, sodium or potassium cations in the passageways and become strongly bonded to the numerous exchange sites. The extreme molecular complexity also significantly reduces the external surface area, which further limits the potential mobility of the contaminants to leach back into the environment.

Each zeolite mineral has a distinct ion exchange selectivity and capacity. This process occurs when water molecules can pass through the channels and pores allowing cations present in the solution to be exchanged for cations in the structure. Several factors must be considered in this process. These include solution strength, pH, temperature and the presence of other competing cations in the solution. These factors can affect both the ion exchange selectivity and capacity of the specific zeolite mineral. Chabazite and Clinoptilolite are two of the minerals in the zeolite group that possess superior ion exchange capability. Chabazite is the preferred zeolite material for use in the preferred embodiment of the invention. However, the invention may be practiced using any treatment material, zeolite or otherwise, that is capable of absorbing heavy metals from storm water. This includes zeolites or other materials that have been chemically enhanced to increase their cation exchange capacity.

Figure 3:
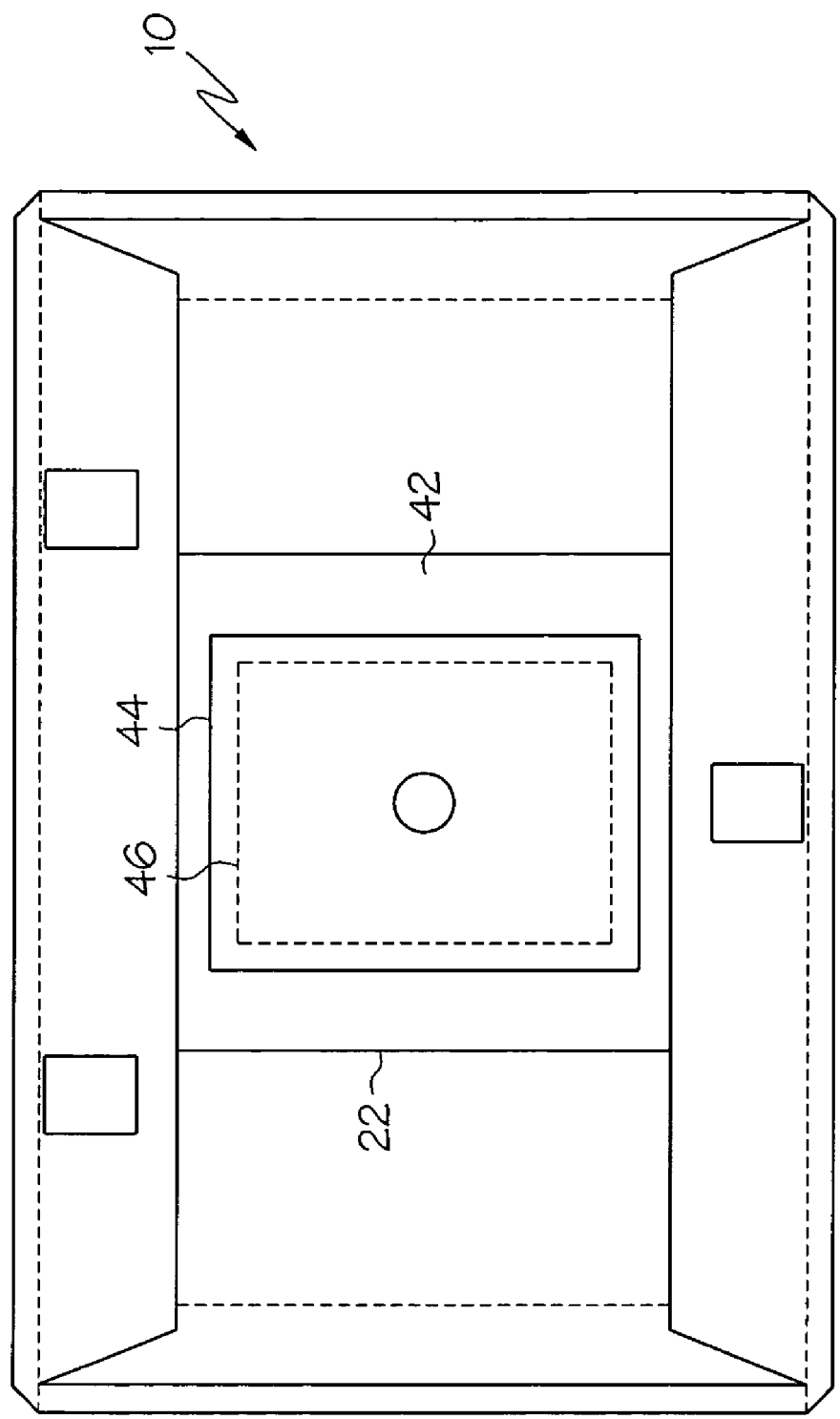
FIG. 3 is a top plan view of the portion of the system that is depicted in FIG. 2.
Figure 10:
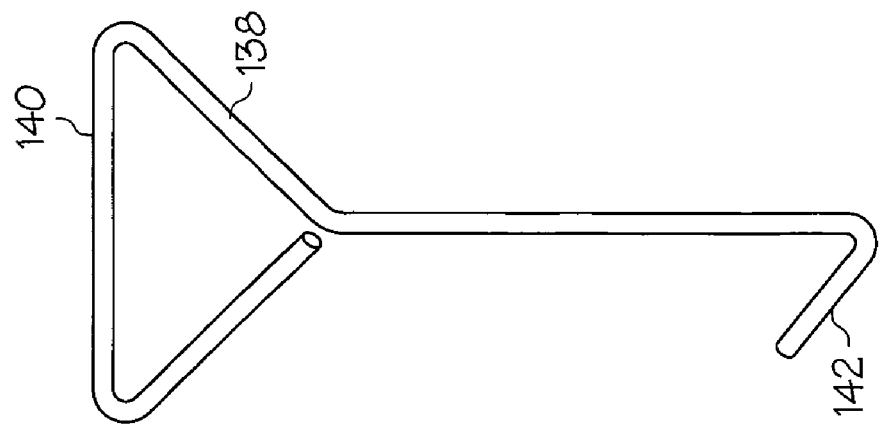
FIG. 10 is a side elevational view of a tool that is preferably used according to the invention in order to deploy and retrieve the mesh bag depicted in FIG. 9.
Figure 9:
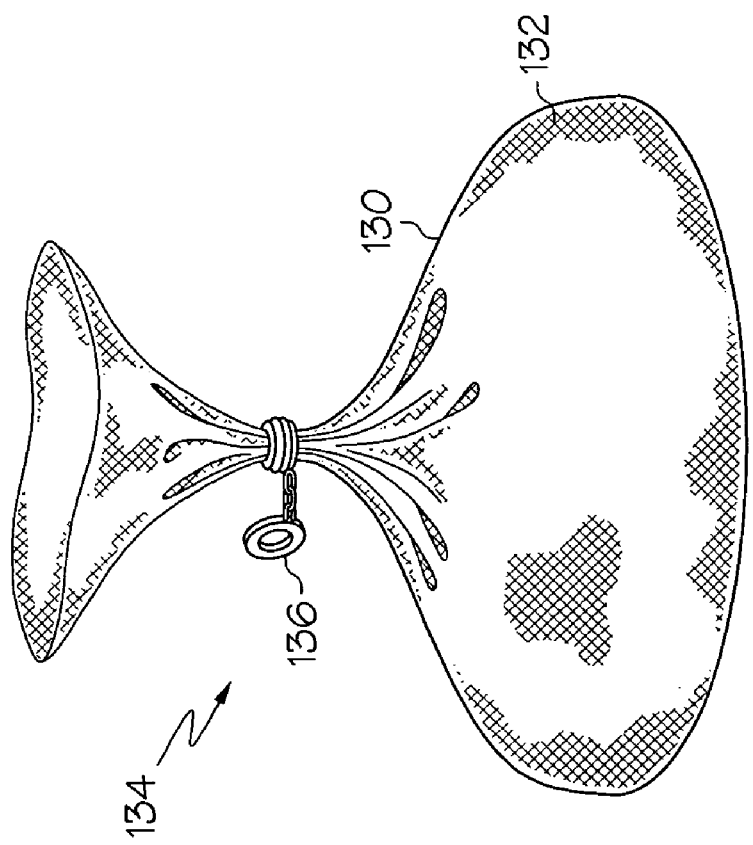
FIG. 9 is a side elevational view of a mesh bag that is used to deploy treatment material according to the preferred embodiment of the invention.

Referring again to FIG. 1, it will be seen that the space defined by the tray 30 and the openings 32 together define a first passageway for admitting storm water from the storm water drainage system into the process chamber 21. Exit openings 38 that are defined in an upper portion of the receptacle 22 define a second passageway for permitting treated storm water to return from the process chamber 21 to the storm water drainage system. Looking now to FIG. 3, which is a top plan view of the system 10, it will be seen that receptacle 22 includes a top cover 42 in which is defined an access opening 46 through which the treatment material 36 may be removed and replaced with new treatment material periodically. A removable media access cover 44 is removably mounted on the top cover 42 to prevent debris from entering the process chamber 21 during normal operating conditions. Referring briefly to FIG. 9 and 10, preferably for all embodiments of the invention the treatment material 36 is provided within one or more mesh bags 130 that are fabricated from a mesh material 132 so that the treatment material 36 may be conveniently positioned within the process chamber 21 and later removed. As FIG. 9 shows, engagement structure 134 is preferably provided on each of the mesh bags 130 for permitting retrieval and lifting of the mesh bags 130 during deployment and retrieval. In the illustrated embodiment, engagement structure 134 is styled as a loop 136. Alternatively, engagement structure 134 may be anyone of a number of possible configurations, such as a hook, a magnet, a steel plate, a hole, or any other structure that may be engaged by a remote tool. FIG. 10 depicts a tool 138 that is used in the preferred embodiment of the invention to deploy and retrieve the mesh bag 130 during installation and maintenance of the system. Tool 138 includes a handle 140 and a hook 142 that is constructed and arranged to be compatible with the engagement structure 134. Specifically, hook 142 is size and shaped so as to be able to conveniently fit within the loop 136 that is attached to the mesh bag 130.

Alternatively, the treatment material 36 may be deployed loosely within the process chamber 21 where it may be removed periodically using vacuum technology.

Figure 5:
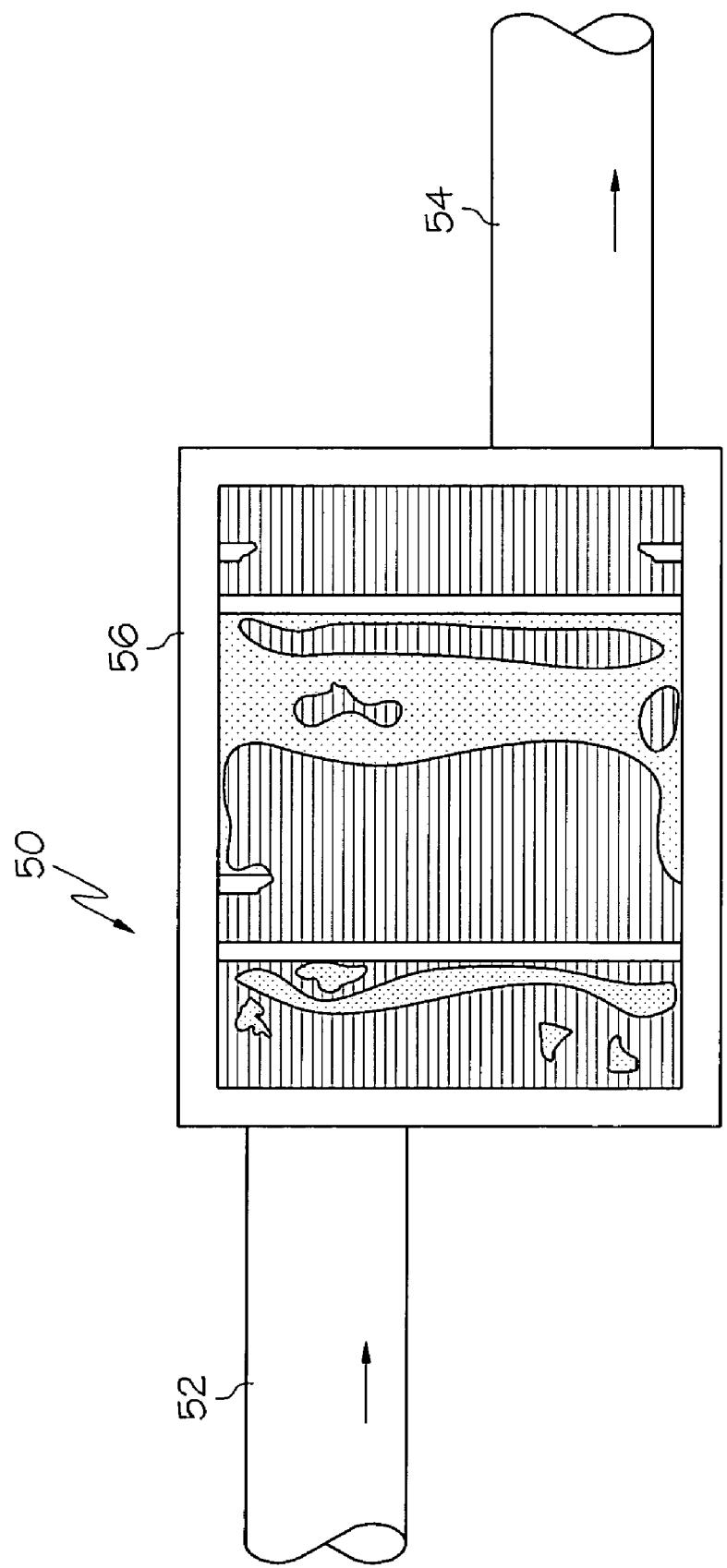
FIG. 5 is a first diagrammatical view of a system that is constructed according to a second embodiment of the invention.
Figure 6:
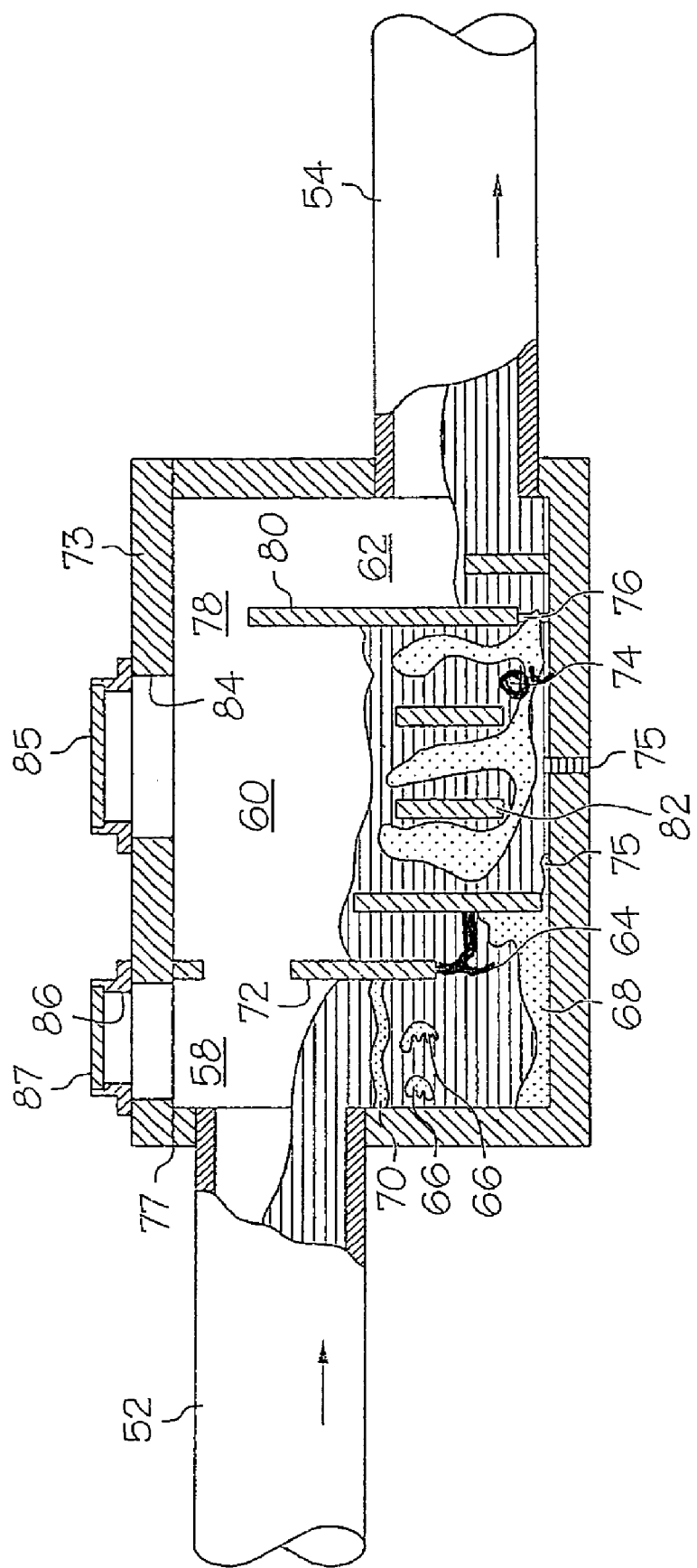
FIG. 6 is a second diagrammatical view of the system that is shown in FIG. 5.

Referring now to FIGS. 5 and 6, a system 50 for treating storm water in situ within a storm water drainage system according to a second embodiment of the invention includes a process chamber 60 that is defined within a vault 56. A first passageway 58 for admitting storm water from the storm water drainage system into the process chamber 60 is in this embodiment in communication with a first storm water conduit 52, while a second passageway 62 for permitting treated storm water to return from the process chamber 60 to the storm water drainage system is in communication with a second storm water conduit 54. As is best shown in FIG. 6, a filter 64 that is preferably constructed of a metallic screen or mesh material is positioned within the first passageway 58 for permitting debris from entering the process chamber 60. First passageway 58 is separated from the process chamber 60 by a first baffle 72 that extends downwardly from a top wall 73 of the vault 56, terminating at the filter 64. As is shown diagrammatically in FIGS. 5 and 6, debris 66 is kept within the first passageway 58 by the filter 64, with sediment material 68 such as sand tending to collect at the bottom of the vault 56 within the first passageway 58 while oily material 70 and other material that will tend to float will collect in an upper portion of the first passageway 58 that is elevated with respect to the downwardmost terminus of the first baffle 72. This will help ensure that oily material 70 that might otherwise pass through the filter 64 will remain collected within the first passageway 58 instead of being driven into the process chamber 60.

To provide a bypass capable of handling 5000 gallons per minute in the event of heavy flow conditions, a window 77 is defined in an upper portion of the first baffle 72. This provides a bypass route through the upper portion of the process chamber 60 and for the through the bypass 78 into the second passageway 62. Additionally, at least one slow drain port 75 is defined in the bottom wall of the vault 56 to prevent water from standing within the vault 56 for a prolonged period of time.

As is shown in FIG. 6, the treatment material 74, which is preferably contained within mesh bags as described above with regard to the previously described embodiment, is kept positioned within the process chamber 60 by a number of positioning baffles 82. In addition, a baffle 80 is provided in order to separate the process chamber 60 from the second passageway 62. As is best shown in FIG. 6, baffle 80 terminates at its lower end a predetermined distance from the bottom of the vault 56 so as to define the space for the process storm water to escape from the process chamber 60 into the second passageway 62 during normal operating conditions. A retention screen 76 is preferably provided within this space for preventing the treatment material 74 from escaping into the second passageway 62. During extreme operating conditions, when the flow of storm water through the conduit 52, 54 exceeds the capacity of the system 50 to process the storm water, excess storm water within the process chamber 60 will be permitted to escape into the second passageway 62 through a bypass opening 78 that is defined between the top edge of the baffle 80 and the top wall 73 of the vault 56.

Referring again to FIG. 6, it will be seen that a first access opening 84 is defined in the top wall 73 of the vault 56 for permitting access to the process chamber 60 in order to position treatment material 74 within the process chamber 60 and to subsequently remove the treatment material 74 and replace it with new treatment material 74. A removable cover 85 is removably mounted on the first access opening 84. Similarly, a second access opening 86 is defined in the top wall 73 of the vault 56 for permitting debris 66 to be removed from the first passageway 58. A cover 87 is removably mounted to the top wall 73 in order to selectively cover and expose the second access opening 86.

Figure 7:
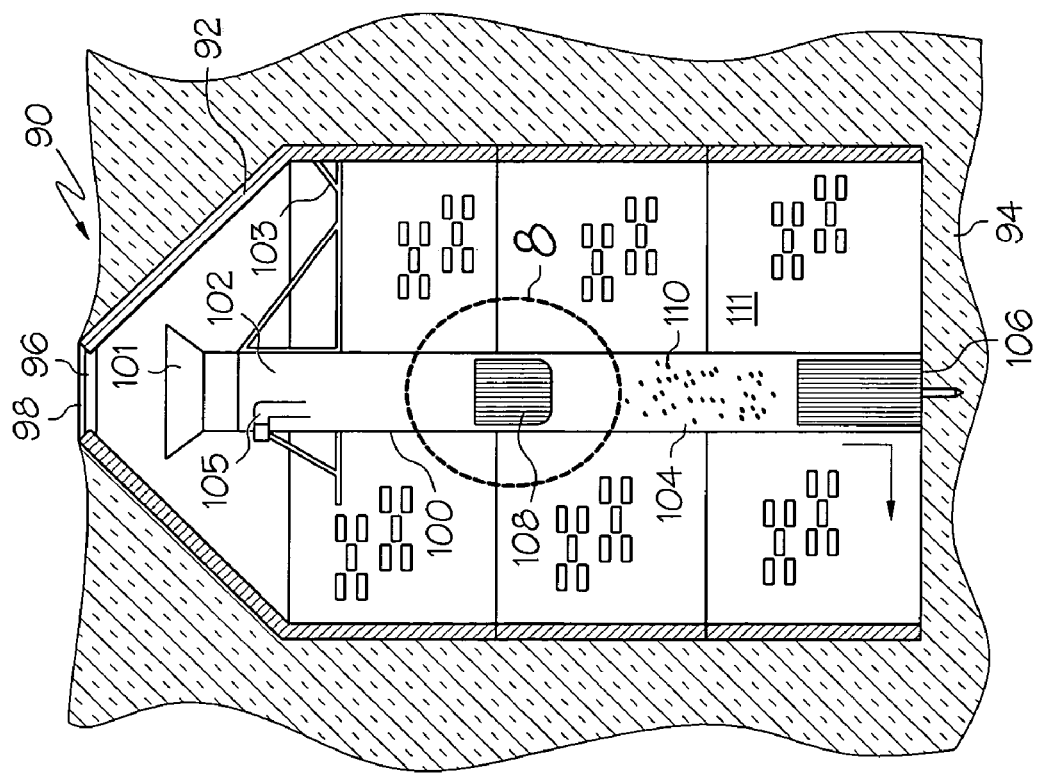
FIG. 7 is a diagrammatical view of a system that is constructed according to a third embodiment of the invention.

A system 90 for treating storm water according to a third embodiment of the invention is depicted in FIG. 7. In this embodiment, the system 90 is mounted within a drainage chamber 92 that is constructed and arranged to induce storm water to be absorbed into the surrounding soil 94. Storm water enters the drainage chamber 92 via an opening 96 that is covered by a grate 98. Storm water flowing through the opening 96 is directed into a vertical conduit 100 by a funnel structure 101 that is positioned a predetermined distance beneath the opening 96. Stabilizer arms 103 are provided to ensure that the vertical conduit 100 stays properly positioned during use. The predetermined difference between the funnel structure 101 and the vertical conduit 100 provides for a bypass opening directly into the drainage chamber 92 that is capable of handling at least 5000 gallons per minute. An upper portion of the conduit 100 defines a first passageway for admitting storm water from the storm water drainage system into a process chamber 110 that is defined within a lower portion 104 of the vertical conduit 100. As is further shown in FIG. 7, a plurality of drainage openings 106 are defined in the lowermost end of the vertical conduit 100 for permitting treated storm water to flow from the process chamber 110 into the drainage chamber 92, where the storm water can be absorbed into the environment. Preferably, the treatment material 111 is positioned loosely within the lower portion 104 of the vertical conduit 100 and is of a size and granularity so that the individual granules of the treatment material 111 will not pass through the drainage openings 106. In order to maximize the surface area of the treatment material 111 that is present within the process chamber 110, larger granules of treatment material 111 may be deposited at the bottom of the vertical conduit 100 nearby to the drainage openings 106, while smaller particles or granules of treatment material 111 may be positioned above this layer of larger particles or granules.

An oil separation tube 105 provides an exit for storm water that collects during flood conditions high enough within the vertical conduit 100 to flow into the oil separation tube and out of the vertical conduit 100. As is shown in FIG. 7, oil separation tube 105 enters the upper portion of the vertical conduit 100 in a radial direction and bends downwardly within the vertical conduit 100. During flood conditions, organic elements such as oil will tend to float on top of the water and will thus tend to be retained within the vertical conduit 100 for processing.

Figure 8:
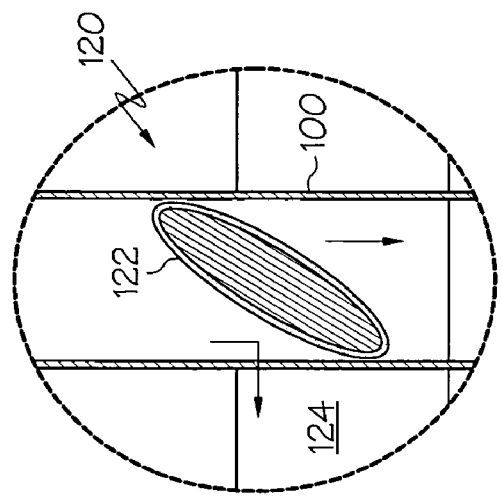
FIG. 8 is a diagrammatical view depicting an alternative construction of one component of the system that is shown in FIG. 7.

Filter structure is preferably provided for preventing debris from entering the process chamber 110 from the upper portion 102 of the vertical conduit 100. In the preferred embodiment, this filter structure is embodied as a debris basket 108 that is accessible and removable by a long pole that may be extended downwardly into the upper portion 102 of the vertical conduit 100 via the opening 96 after the grate 98 has been removed. In an alternative embodiment, shown in FIG. 8, a filter arrangement 120 is provided wherein a separate debris exit 124 is defined in the conduit 100, and a debris grill 122 is positioned within the vertical conduit 100 at an angle with respect to the longitudinal axis of the conduit 100 in order to direct debris out of the vertical conduit 100 into the debris exit 124 while permitting storm water to flow downwardly into the process chamber 110. The advantage of this embodiment of the invention is that it is self maintaining, obviating the need to periodically service the system 90 to remove collected debris.

A system for treating storm water according to any of the previously described embodiment may be installed as original equipment on a storm water drainage system or, must advantageously, may be retrofitted onto an existing storm water drainage system in order to mitigate the environmental effects of contaminated storm water. Within the scope of the invention, as an alternative embodiment, the treatment material may be introduced directly into the system with minimal or no containment. For example, the treatment material may be simply contained within the mesh bag 130 and deployed in a drainage system that has no process chamber or in a drainage system that has a space that is designed for purposes other than the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for treating storm water in situ within a storm water drainage system, comprising:
   a process chamber;
   treatment material contained within said process chamber, said treatment material being capable of absorbing heavy metals from storm water;
   a first passageway for admitting storm water from the storm water drainage system into said process chamber;
   a second passageway for permitting treated storm water to return from the process chamber to the storm water drainage system;
   wherein said process chamber comprises a receptacle that is constructed and arranged to be positioned beneath a storm drain; and
   wherein said receptacle comprises a bottom surface for supporting said treatment material and at least one sidewall, and wherein said second passageway is defined in said sidewall.

2. A system for treating storm water according to claim 1, further comprising an access opening defined in said receptacle for permitting said treatment material to be removed and replaced with new treatment material.

3. A system for treating storm water according to claim 2, further comprising a removable cover positioned over said access opening.

4. A system for treating storm water in situ within a storm water drainage system, comprising:
   a process chamber;
   treatment material contained within said process chamber, said treatment material being capable of absorbing heavy metals from storm water;
   a first passageway for admitting storm water from the storm water drainage system into said process chamber; and
   a second passageway for permitting treated storm water to return from the process chamber to the storm water drainage system;
   wherein said process chamber is defined within a vault, said first passageway being defined within said vault in communication with a first storm water conduit, said second passageway also being defined within said vault and being in communication with a second storm water conduit; and
   further comprising treatment material retention means for preventing said treatment material from escaping into said second passageway.

5. A system for treating storm water in situ within a storm water drainage system, comprising:
   a process chamber;
   treatment material contained within said process chamber, said treatment material being capable of absorbing heavy metals from storm water;
   a first passageway for admitting storm water from the storm water drainage system into said process chamber; and
   a second passageway for permitting treated storm water to return from the process chamber to the storm water drainage system;
   wherein said process chamber is defined within a vault, said first passageway being defined within said vault in communication with a first storm water conduit, said second passageway also being defined within said vault and being in communication with a second storm water conduit;
   further comprising a first access opening defined in said vault for permitting said treatment material in said process chamber to be removed and replaced with new treatment material; and
   further comprising a second access opening defined in said vault for permitting debris to be removed from said first passageway.

6. A system for treating storm water according to claim 5, further comprising a removable cover that is mounted to removably cover said first access opening.

7. A system for treating storm water in situ within a storm water drainage system, comprising:
   a process chamber;
   treatment material contained within said process chamber, said treatment material being capable of absorbing heavy metals from storm water;
   a first passageway for admitting storm water from the storm water drainage system into said process chamber; and
   a second passageway for permitting treated storm water to return from the process chamber to the storm water drainage system;
   wherein said process chamber is defined within a vault, said first passageway being defined within said vault in communication with a first storm water conduit, said second passageway also being defined within said vault and being in communication with a second storm water conduit; and
   further comprising positioning means located in said process chamber for positioning said treatment material within said process chamber.

8. A system for treating storm water in situ within a storm water drainage system, comprising:
   a process chamber;
   treatment material contained within said process chamber, said treatment material being capable of absorbing heavy metals from storm water;
   a first passageway for admitting storm water from the storm water drainage system into said process chamber; and
   a second passageway for permitting treated storm water to return from the process chamber to the storm water drainage system; and
   wherein said process chamber is defined within a conduit, said first passageway comprising an upper portion of said conduit, said second passageway comprising a lower portion of said conduit that is constructed and arranged to permit storm water to drain into surrounding soil.

9. A system for treating storm water according to claim 8, further comprising filter means positioned within said upper portion of said conduit for preventing debris from entering said process chamber.

10. A system for treating storm water according to claim 9, wherein said filter means comprises a debris basket that is removably positioned within said upper portion of said conduit, said debris basket being shaped and sized so as to be removable by withdrawing said debris basket through said upper portion of said conduit.

11. A system for treating storm water according to claim 8, wherein said conduit is positioned so as to be substantially vertical in orientation.

12. A system for treating storm water according to claim 8, wherein said lower portion of said conduit is positioned within a drainage chamber, said lower portion of said conduit having at least one drainage opening defined therein for permitting storm water to flow therefrom into said drainage chamber.

* * * * *